United States Patent
Sato et al.

(10) Patent No.: US 7,023,906 B2
(45) Date of Patent: Apr. 4, 2006

(54) RECEIVER AND RECEIVING METHOD IN SPREAD SPECTRUM COMMUNICATION SYSTEM

(75) Inventors: Takaharu Sato, Tokyo (JP); Takashi Ueda, Tokyo (JP)

(73) Assignee: Kawasaki Microelectronics, Inc., Chiba (JP)

( * ) Notice: Subject to any disclaimer, the term of this patent is extended or adjusted under 35 U.S.C. 154(b) by 796 days.

(21) Appl. No.: 09/793,492

(22) Filed: Feb. 27, 2001

(65) Prior Publication Data

US 2001/0030996 A1 Oct. 18, 2001

(30) Foreign Application Priority Data

Feb. 28, 2000 (JP) ............................. 2000-051011

(51) Int. Cl.
*H04B 1/69* (2006.01)
(52) U.S. Cl. ..................... 375/152; 375/134; 375/142; 375/143; 375/145; 375/149; 375/150; 375/343
(58) Field of Classification Search ................ 375/152, 375/143, 150, 267, 243, 147, 343, 155, 141, 375/142, 330, 355, 134, 145, 149; 370/342, 370/324, 441, 515
See application file for complete search history.

(56) References Cited

U.S. PATENT DOCUMENTS

| | | | | | |
|---|---|---|---|---|---|
| 5,943,362 | A | * | 8/1999 | Saito | 375/143 |
| 6,154,487 | A | * | 11/2000 | Murai et al. | 375/150 |
| 6,345,069 | B1 | * | 2/2002 | Dabak et al. | 375/152 |
| 6,466,566 | B1 | * | 10/2002 | De Gaudenzi et al. | 370/342 |
| 6,487,193 | B1 | * | 11/2002 | Hamada et al. | 370/342 |
| 6,665,277 | B1 | * | 12/2003 | Sriram | 370/324 |

* cited by examiner

Primary Examiner—Stephen Chin
Assistant Examiner—Ted M. Wang
(74) Attorney, Agent, or Firm—Oliff & Berridge, PLC

(57) ABSTRACT

An over-sampling circuit is provided at a front stage of a digital matched filter, and a received signal is over-sampled with it. Synchronous acquisition of the received spread spectrum signal is implemented by adding the data obtained by the over-sampling, inputting it into the digital matched filter, and then performing a correlation thereon.

8 Claims, 3 Drawing Sheets

RECEIVER AND RECEIVING METHOD IN SPREAD SPECTRUM COMMUNICATION SYSTEM

BACKGROUND OF THE INVENTION

1. Field of Invention

The present invention relates to a receiver and a receiving method in a spread spectrum communication system.

2. Description of Related Art

Recently, a spread spectrum communication system has been utilized in terrestrial mobile communication. This system transmits, on a transmitting side, a signal by multiplying a data signal by a spread code so as to spread the bandwidth of the data signal to a wider frequency bandwidth, and on a receiving side, convert the received signal to the bandwidth of the original data signal by using the same spread code as used on the transmitting side to demodulate the received signal. In this method, a psuedo noise (PN) sequence is used as the spread code. On the transmitting side, the data signal to be transmitted is narrow-band modulated, and a spread modulation is implemented by using the PN sequence, so as to transmit the signal by shifting it into a predetermined transmission bandwidth. On the receiving side, a correlation peak is detected by making a correlation between the received signal and the same PN sequence as used in the transmission so as to synchronize the received signal with a target signal.

Synchronization is an operation that matches the operation timing of a device on the receiving side with the signal sent from the transmitting side. A receiver estimates the generation timing of a spread code sequence of the received signal and matches it with the generation timing of a spread code sequence prepared within the receiver.

Conventionally, it is well known in the art to use a method of using a sliding correlator or a method of using a matched filter to accomplish synchronization (the synchronous acquisition). In the method of using the sliding correlator, the spread code sequence is generated at an appropriate timing in the receiver, and then synchronized by gradually shifting the timing thereof. However, this method requires a large time period to perform synchronization.

On the other hand, in the method of using the matched filter, a detection of a correlation value is implemented instantaneously using the matched filter so as to enable synchronization in a short time period. In this method, when receiving the spread spectrum signal on the receiving side, after the received signal has been passed through a low pass filter, such as a roll-off filter or a root nyquist filter (RNF), the signal is directly input into a digital matched filter, and the digital matched filter is operated at the chip rate.

FIG. 4 shows the configuration of a main part of a conventional spread spectrum communication receiver. In this system, it is assumed that a signal to be transmitted is spread by multiplying the signal by a spread code with a spread factor SF equal to 256, and a chip rate equal to 4 MHz.

As shown in FIG. 4, a received signal with a 6-bits width that has passed through the root nyquist filter 90 is input into a digital matched filter 92. Because the input signal has a spread factor SF equal to 256, the digital matched filter 92 requires 256 stages. The digital matched filter 92 operates for each chip rate, i.e., one chip. (One pulse or one bit of the spread code sequence is referred to as a chip.) Accordingly, the received signal to be input into the digital matched filter 92 is sampled at the chip rate, at only one point in the chip. As a result, in the case of having sampled a variable point of the chip, the correlation value will be deteriorated, and data reproduction will be impossible. As a result, the performance thereof will be deteriorated.

SUMMARY OF THE INVENTION

This invention is made in the view of the conventional problems described above. Accordingly, an object of this invention is to provide a receiver that is used in a spread spectrum communication system that is capable of suppressing an increase in the size of a circuit as well as enhancing the reception performance.

This object can be achieved by a spread spectrum communication receiver that implements a synchronous acquisition of a received spread spectrum signal, the spread spectrum communication receiver includes:

an over-sampling circuit for implementing a N-times over-sampling for one chip of the received signal; and a digital matched filter for obtaining a correlation between the received signal and a spread code pattern installed therein, wherein N pieces of data obtained by the over-sampling are added and input to the digital matched filter.

Preferably, in the spread spectrum communication receiver, the added data is divided by the sampling number N so as to equalize the data, and the equalized data is input to the digital matched filter.

More preferably, in the spread spectrum communication receiver, the digital matched filter has the same number of stages as the one in a case of not over-sampling, and operates at a chip rate.

Additionally, in the spread spectrum communication receiver, the over-sampling circuit includes an adder that adds the N pieces of data obtained by the over-sampling.

The spread spectrum communication receiver, preferably further includes a root nyquist filter or a low pass filter that removes inter symbol interference of the received signal.

Furthermore, in the spread spectrum communication receiver, the received signal filtered by the root nyquist filter or the low pass filter is input to the over-sampling circuit.

The spread spectrum communication receiver further includes a detector that detects a maximum correlation value among correlation values obtained by the digital matched filter, preferably.

This object can be achieved by a spread spectrum communication receiver which implements a synchronous acquisition of a received spread spectrum signal, the spread spectrum communication receiver includes:

interference removing means for removing inter symbol interference of the received signal;

over-sampling means; and correlation means for obtaining a correlation between the received signal and a spread code pattern installed therein, wherein the correlation means operates at a chip rate, without increasing the number of stages thereof, in such a manner that after removing the inter symbol interference of the received signal by the interference removing means, over-sampling is performed by the over-sampling means, and then the obtained data is added and input to the correlation means.

Another object of this invention is to provide a receiving method that enables the suppression of an increase in the size of a circuit as well as the enhancement of the reception performance.

This object can be achieved by a spread spectrum communication receiving method of implementing a synchronous acquisition of a received spread spectrum signal, the method includes the steps of:

performing over-sampling of the received signal;

adding the over-sampled data and inputting the over-sampled data into a digital matched filter; and operating the digital matched filter at a chip rate, without increasing the number of stages.

Preferably, in the spread spectrum communication receiving method, the received signal is one which undergoes a process of removing inter symbol interference of the received signal before performing the over-sampling thereof.

Additionally, the spread spectrum communication receiving method further includes the step of detecting a maximum correlation value among correlation values obtained by the digital matched filter.

Further objects and advantages of the invention can be more fully understood from the following detailed description taken in conjunction with the accompanying drawings.

DETAILED DESCRIPTION OF PREFERRED EMBODIMENTS

The preferable embodiments of the spread spectrum communication receiver and the receiving method according to the present invention will be described in more detail, with reference to the accompanying drawings.

In the first exemplary embodiment, an over-sampling circuit is provided at a front stage of a digital matched filter, and N-times over-sampling is applied on a received signal. Then, the over-sampled bits are input into the digital matched filter operating at a chip rate. As a result, for example, even though a variable point in a received signal is sampled at one point in the chip, if the other N−1 points would sample the correct value, the influence thereof is small, and thus it enables a decrease in the deterioration of a correlation value. Further, it enables the enhancement of a fading tolerance (resistance) for the same reason.

Figure 1:
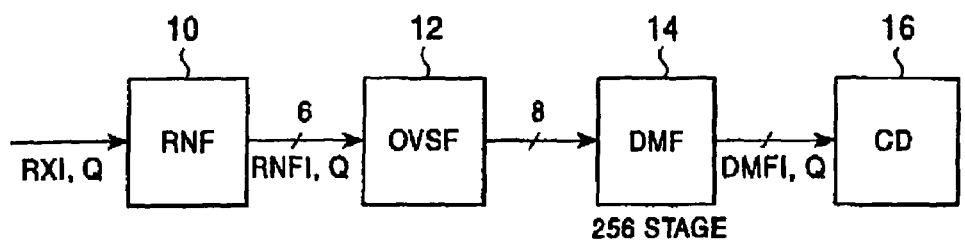
FIG. 1 is a block diagram showing the characteristic structure of a spread spectrum communication receiver according to a first exemplary embodiment of the invention.

FIG. 1 is a block diagram showing the characteristic structure of the spread spectrum communication receiver according to the first exemplary embodiment of the invention.

It is assumed that the receiver of this embodiment receives a spread signal transmitted from the transmitting side, which has a width of 6 bits. Further, it is assumed that the chip rate of the spread code by which the transmitting data is multiplied is 4 MHz with a spread factor SF equal to 256.

The root nyquist filter 10 has a so-called raised cosine roll-off characteristic, and enables the prevention of inter symbol interference. In general, instead of the root nyquist filter, a low pass filter (LPF) can be used.

The over-sampling circuit 12 is provided at the front stage of the digital matched filter 14. In the first exemplary embodiment, it is assumed that the over-sampling circuit 12 samples every ¼ chip, for an input signal with a width of 6-bits (i.e., it samples 4 times for 1 chip), and as a result a 4-times over-sampling will be implemented. The over-sampling circuit 12 is such that, in order to implement the 4-times over-sampling, the bit width of an output thereof increases by $\log_2 4=2$ and thus it becomes 6+2=8 bits wide. Accordingly, the size of the circuit of the digital matched filter 14 will increase by the same amount, and the over-sampling circuit 12 will also increase; however these increases can be ignored compared to the comparative example which will be described later.

Figure 5:
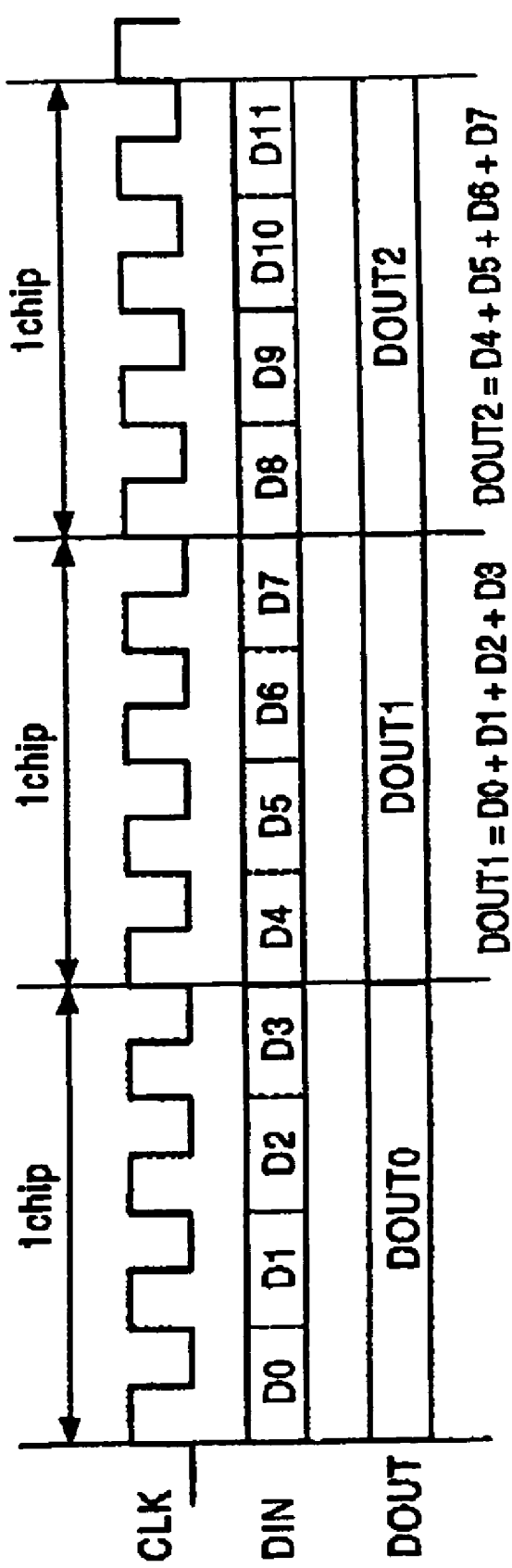
FIG. 5 is a timing diagram showing over-sampling in an over-sampling circuit that constitutes the spread spectrum communication receiver of this invention, and a data addition thereof.
Figure 6:
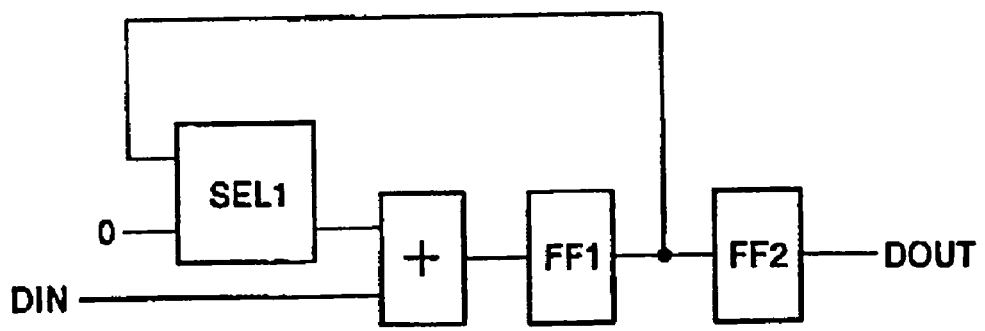
FIG. 6 is a block diagram showing a first structural example of an adder in the over-sampling circuit that constitutes the spread spectrum communication receiver of this invention.
Figure 7:
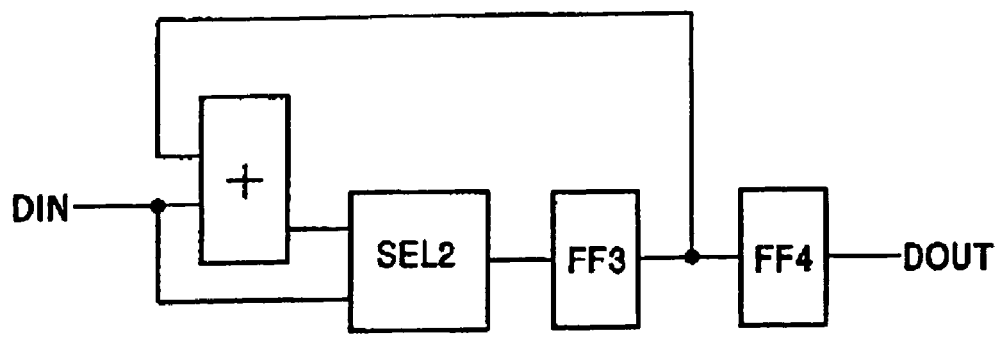
FIG. 7 is a block diagram showing a second structural example of an adder in the over-sampling circuit that constitutes the spread spectrum communication receiver of this invention.

FIG. 5 is a timing diagram showing over-sampling in the over-sampling circuit that constitutes the spread spectrum communication receiver according to this invention and the data addition (sum) thereof. FIG. 6 and FIG. 7 are block diagrams, respectively, showing the first and the second structural examples of an adder in the over-sampling circuit that constitutes the spread spectrum communication receiver of the present invention.

As shown in FIG. 5, the received data that is input is sampled 4 times for every 1 chip rate with a clock CLK. After the over-sampled data, for example, D0, D1, D2 and D3 has been input as DIN in sequence and added (summed) in the adder, as shown in FIG. 6 or FIG. 7, they are output as DOUT. The selectors SEL1 and SEL2 as shown in FIG. 6 and FIG. 7 select the data D0 which is input first, and then the additional data thereafter. That is, in a case of the circuit example of FIG. 6, since the over-sampled data D0 has no data preceding to be added, "0", which is selected by the selector SEL1, and D0 is added and input into a flip-flop FF1. Then, the over-sampled data D1 is added to the previous D0 that is selected by the selector SEL1 and they are input into the flip-flop FF1. Thereafter, D2 and D3 are added in sequence, and the added data, D0+D1+D2+D3, is output as DOUT. In a case of the circuit example of FIG. 7, the first over-sampled data D0 is input into the flip-flop FF3 through the selector SEL2, and thereafter, the next data D1 is added to D0, and they are input into the flip-flop FF3 through the selector SEL2. Thereafter, similarly, D2 and D3 are added in sequence, and the added data is then output as DOUT.

Referring now to FIG. 1, the digital matched filter 14 implements a synchronous timing detection by utilizing the spread code. When the received spread spectrum signal that is output from the over-sampling circuit 12 is input into the digital matched filter 14, the digital matched filter 14 implements despread spectrum processing by obtaining a correlation between this input signal and the spread code pattern installed therein. Then, the synchronous acquisition is implemented by detecting a maximum correlation value among the obtained correlation values with a correlation detector 16.

The correlation detector 16 is placed at a subsequent stage with respect to the digital matched filter 14 to add an output of the digital matched filter and to detect a correlation peak value that is generated when the received signal and the same PN sequence as used on the transmitting side are correlated.

Although the amount of data becomes 4 times as large by implementing the 4-times over-sampling, as described above, each of these 4 pieces of data are added to combine, and are input into the digital matched filter 14. Accordingly, the digital matched filter 14 also has 256 stages in the case of not over-sampling, and the number of stages does not increase compared to the conventional technique. Further, the digital matched filter 14 is also operated for every chip rate, similarly to the conventional technique.

Figure 4:
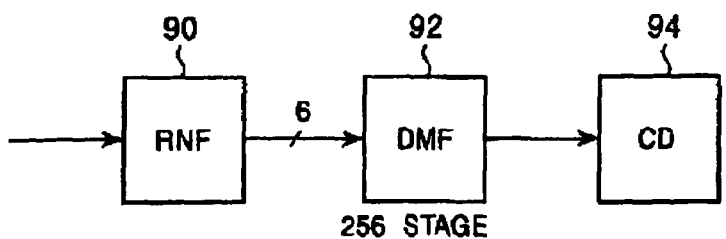
FIG. 4 is a block diagram showing the characteristic structure of a conventional spread spectrum communication receiver.

Incidentally, in the conventional case of not implementing over-sampling, as shown in FIG. 4, 6-bits width data is input into the digital matched filter, and the subsequent stage of the digital matched filter has 256 stages and is operated for every chip. In this embodiment, as described above, the bit width of the input signal is $6+\log_2 4=8$ bits, and the circuit size, as well as the electric power consumption, becomes $8/6=1.33$ times those of the conventional example. However, such degree of increase is a negligible level compared to the influence caused by the increase of the number of stages and the operating frequency of the digital matched filter in the comparative example, as described later.

Further, in this embodiment, it is preferable to include an equalization circuit. After the over-sampled data has been added in sequence, the equalization circuit divides the added data by the number of over-samplings, and this equalized data is input to the digital matched filter. In such a case, although the bit accuracy may be decreased compared to the case in which the over-sampled data is added as described above, the width of the input to the digital matched filter remains at 6-bits, and the number of registers in the digital matched filter also does not increase.

In order to solve the problem in the conventional technique as described above, we consider an example (comparative example to this embodiment) wherein a 4-times over-sampling is implemented. The number of stages of the digital matched filter is multiplied by 4 ($256\times4=1024$ stages) and an input signal is 6-bits wide and is operated every ¼ chip.

Figure 2:
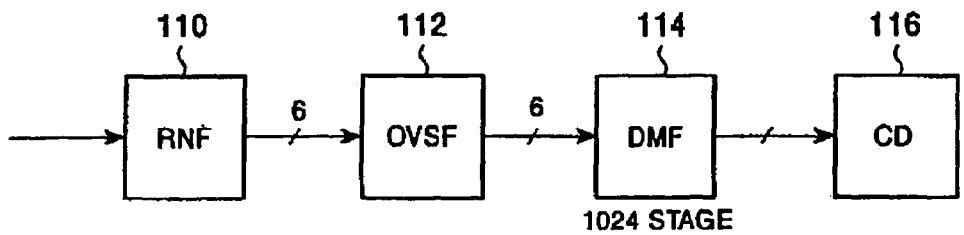
FIG. 2 is a block diagram showing a schematic structure of a comparative example with respect to the first exemplary embodiment of the invention.

FIG. 2 shows the schematic structure of this comparative example. As shown in FIG. 2, a received signal is 4-times over-sampled in an over-sampling circuit 112 after having passed through a root nyquist filter 110. The over-sampled data is input into a digital matched filter 114 that has 1024 stages and operates every ¼ chip. In this comparative example, since the digital matched filter 114 has 4-times the number of stages compared to the conventional system, it processes 4-times the amount of data obtained from the 4-times over-sampling. As a result, the accuracy will be dramatically improved.

However, in this case, the digital matched filter 114 requires a number of registers equal to (the number of input bits)×(the number of taps of the spread code length×4), and the circuit size of the digital matched filter 114 becomes 4 times larger. Thus, there is problem in that the circuit size becomes substantially larger. Further, at this time, the digital matched filter 114 must be operated at a chip rate of 16 MHz, which is, 4 times 4 MHz. Thus, there is problem in that the electrical power consumption, which is estimated to be $4^2$ times, substantially increases.

However, in this embodiment, differing from the comparative example as described above, the enhancement of the performance thereof is achieved without making the circuit size substantially larger. Moreover, at the same time, this embodiment also achieves the suppression of an increase in the electrical power consumption.

In the following, a second exemplary embodiment of the invention will be described.

Figure 3:
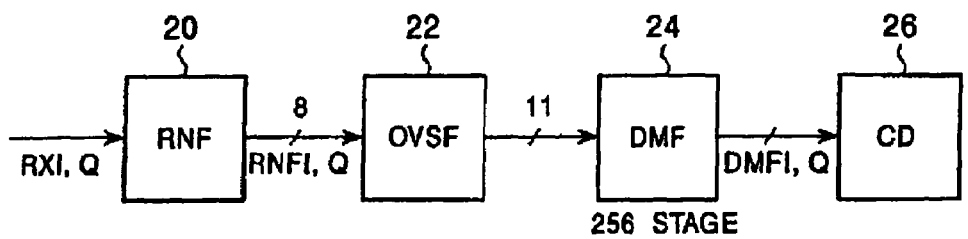
FIG. 3 is a block diagram showing the characteristic structure of a spread spectrum communication receiver according to a second exemplary embodiment of the invention.

FIG. 3 is a block diagram showing the characteristic structure of a spread spectrum communication receiver according to the second exemplary embodiment.

Although the apparatus structure of this embodiment is the same as the one in the first embodiment as described above, the receiver in the embodiment receives a signal transmitted from the transmitting side, which is spread and has a width of 8-bits. Further, it is assumed that the chip rate of the spread codes by which the transmitting data is multiplied is 4 MHz with a spread factor SF of 256. It is also assumed that the over-sampling circuit 22 over-samples 8 times, i.e., it samples every ⅛ chip (8-times sampling for 1 chip).

Accordingly, the over-sampling circuit 22 is such that, in order to implement the 8-times over-sampling, the bit width of an output thereof is increased by $\log_2 8=3$ bits and thus it becomes $8+3=11$ bits wide.

Further, it is assumed that the number of stages of the digital matched filter 24 is 256, wherein the digital matched filter 24 operates every 1 chip, and the 8-times data obtained by 8-times over-sampling, that is, 8 pieces of data, is added and input into the digital matched filter 24. Accordingly, the number of subsequent stages of the digital matched filter 24 does not increase.

In the conventional case, which does not over-sample, as shown in FIG. 4, a signal received with a width of 8-bits is input into the digital matched filter having 256 stages operating every 1 chip. In this embodiment, as described above, the data input into the digital matched filter 24 is $8+\log_2 8=11$ bits, and the circuit size and electrical power consumption becomes $11/8=1.375$ times compared to the conventional case. However, such a degree of increase is negligible compared to the comparative example to be described later.

On one hand, referring to the structure of FIG. 2 as the comparative example, 8-times over-sampling is implemented, and the number of stages of the digital matched filter is $256\times8=2048$, operating every ⅛ chip with an input of 8 bits. Thus, the accuracy thereof will be improved, but the digital matched filter of this case requires a number of the registers equal to (the number of input bits)×(the number of taps of the spread code length×8), and the circuit size of the digital matched filter becomes 8 times larger. Further, at this time, a substantial increase of the electrical power consumption is estimated to be $8^2$ times.

Accordingly, compared to this comparative example, this embodiment achieves the enhancement of the performance without making the circuit size substantially larger. Moreover, at the same time, the suppression of an increase in the electrical power consumption is also achieved.

As described above, according to these embodiments, the problems in the conventional technique, such as a performance deterioration because of a correlation value deterioration, the difficulty of reproducing data, and a weakness to fading, which are generated as a result of the received signal being input into the digital matched filter and sampled at the chip rate, at one point in the chip, can be solved.

Furthermore, as in the comparative example described above, the problems, such as the number of stages of the digital matched filter becoming N times larger by simply performing N-times over-sampling, the circuit size and the electrical power consumption becoming increased, are solved.

As illustrated above, according to this invention, an enhancement of the performance can be achieved without substantially enlarging the circuit size. Furthermore, an increase of the electrical power consumption can be suppressed at the same time.

While this invention has been described in conjunction with specific embodiments thereof, it is evident that many alternatives, modifications and variations will be apparent to those skilled in the art. Accordingly, preferred embodiments of the invention as set forth herein are intended to be illustrative and not limiting. Various changes may be made without departing from the spirit and scope of the invention.

What is claimed is:

1. A spread spectrum communication receiver which implements a synchronous acquisition of a received spread spectrum signal, comprising:
    an over-sampling circuit for implementing an N-times over-sampling for one chip of the received signal (N is integer larger than 1); and
    a digital matched filter for obtaining a correlation between the received signal and a spread code pattern installed therein,
    wherein N pieces of data obtained by the over-sampling are added, the added data is divided by the sampling number N so as to equalize the added data, and the equalized data is input to the digital matched filter.

2. A spread spectrum communication receiver which implements a synchronous acquisition of a received spread spectrum signal, comprising:
    an over-sampling circuit for implementing an N-times over-sampling for one chip of the received signal (N is integer number larger than 1); and
    a digital matched filter for obtaining a correlation between the received signal and a spread code pattern installed therein,
    wherein N pieces of data obtained by the over-sampling are added, the added data is input to the digital matched filter, the digital matched filter has the same number of stages as one in a case that provides no over-sampling, and operates at a chip rate.

3. A spread spectrum communication receiver according to claim 1, wherein the digital matched filter has the same number of stages as one in a case that provides no over-sampling, and operates at a chip rate.

4. A spread spectrum communication receiver according to claim 2, wherein the over-sampling circuit includes an adder for adding the N pieces of data obtained by over-sampling.

5. A spread spectrum communication receiver according to claim 2, further comprising a root nyquist filter or a low pass filter for removing inter symbol interference of the received signal.

6. A spread spectrum communication receiver according to claim 5, wherein the received signal filtered by the root nyquist filter or the low pass filter is input to the over-sampling circuit.

7. A spread spectrum communication receiver according to claim 2, further comprising a detector that detects a maximum correlation value among correlation values obtained by the digital matched filter.

8. A spread spectrum communication receiver according to claim 5, further comprising a detector that detects a maximum correlation value among correlation values obtained by the digital matched filter.

* * * * *